US006473895B1

(12) United States Patent
Lopes et al.

(10) Patent No.: US 6,473,895 B1
(45) Date of Patent: Oct. 29, 2002

(54) ASPECT-ORIENTED SYSTEM MONITORING AND TRACING

(75) Inventors: Cristina V. Lopes, San Francisco, CA (US); Gregor J. Kiczales, Palo Alto, CA (US); John O. Lamping, Los Altos, CA (US); Erik A. Hilsdale, Bloomington, IN (US); Venkatesh Choppella, Sunnyvale, CA (US); Taher H. Haveliwala, Granite Bay, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/357,508

(22) Filed: Jul. 20, 1999

(51) Int. Cl.[7] .................................................. G06F 9/44
(52) U.S. Cl. ........................ 717/128; 717/127; 717/114
(58) Field of Search ............................... 717/4, 128, 127

(56) References Cited

U.S. PATENT DOCUMENTS 5,822,593 A  * 10/1998  Lamping et al. ................ 717/9
6,018,625 A  *  1/2000  Hayball et al. ............. 709/223
6,212,676 B1 *  4/2001  Seaman et al. ................ 717/4
6,233,610 B1 *  5/2001  Hayball et al. ............. 709/223

OTHER PUBLICATIONS

Walker et al., An Initial Assessment of Aspect–Oriented Programming, May 16, 1999, p. 1–10, ACM.*
Irwin et al., Aspect–Oriented Programming of Sparse Matrix Code, 1997, p. 1–9, Internet.*
Mendhekar et al., RG: A Case–Study for Aspect–Oriented Programming, Feb. 1997, p. 21–33, Internet.*
Murphy et al., Evaluating Emerging Software Development Technologies: lessons Learned from Assessing Aspect–Oreinted Programming, Jul. 1999, p. 438–455, IEEE.*
Kersten et al., Atlas: A Case Study in Building A Web–Based Learning Environment using Aspect–Oriented Programming, 1999, p. 1–13.*
Kiczales, G., Lamping, J., Mendhekar, A., Maeda, C., Lopes, C.V., Loingtier, J–M., Irwin, J., "Aspect–Oriented Programming", published in Proceedings of the European Conference on Object–Oriented Programming (ECOOP), Finland. Springer–Verlag LNCS 1241, Jun. 1997, (c) 1997.

* cited by examiner

*Primary Examiner*—Tuan Q. Dam
*Assistant Examiner*—John Q. Chavis
(74) *Attorney, Agent, or Firm*—Peter Y. Wang

(57) ABSTRACT

An aspect oriented system for implementing system monitoring and tracing is provided in which the monitoring and tracing functionality needs not be coded into the resources being monitored or traced. Rather, an aspect is provided which encapsulates the monitoring/tracing behavior. This behavior may easily and transparently be forced onto the resource by compiling the object class for the resource along with the monitoring/tracing aspect. When the monitoring/tracing is no longer needed, it is removed simply by recompiling the resource object classes without the aspect.

5 Claims, 5 Drawing Sheets

ASPECT-ORIENTED SYSTEM MONITORING AND TRACING

This invention was made with Government support under Contract F30602-97-C-0246 awarded by the Air Force. The Government has certain rights in this invention.

FIELD OF THE INVENTION

The present invention relates generally to system monitors for monitoring various computer/communications resources, and more particularly to an aspect-oriented programming implementation of a system monitor.

BACKGROUND OF THE INVENTION

Modem computer systems generally include many resources, including network access, processing cycles, storage allocation and access, and output device access, among others. With such complex systems some type of administration is typically needed to control and manage the computer system to ensure the efficient operation of the system. For proper administration of the system, it is necessary to monitor for various events occurring within the computer system. These events might include service calls to various resources, completions of service requests, and notifications of errors, among many others. These events are either monitored either by each individual resource sending some form of notification, or by a centralized system monitor which polls each resource to determine a status of the resource.

Prior art system monitors developed using traditional programming languages have some properties that make system monitoring difficult to implement and maintain. In the prior art, implementing the system monitors with traditional programming languages requires that some code for performing system monitoring be intermingled with the code for implementing resource functionality. This results in the weakening of the functional abstractions of both the resource and of the monitoring systems.

Another problem that may be encountered with prior art programming occurs during system development, where a monitoring or tracing function is desired during testing, but not after testing is completed. Since the code for implementing the system monitor is interspersed with code for the resource being developed, the task of removing the system monitoring code after testing involves substantial editing of the software entity embodying the resource. Worse, if the resource needs to be modified after the system monitor code has been removed, the developer must edit the software entity again to replace the monitoring code.

Traditional programming languages typically work well for design decisions that define a unit of functionality, such as a procedure or an object. Procedural languages such as for Fortran, Pascal, and C are useful for defining programs where the execution is straightforward, beginning at a starting point and executing in a stepwise manner to an end. In this model, design issues can be addressed by units of contiguous program execution. Deviations from the straightforward path are provided by function calls which allow program execution to jump from the main routine to the subroutine, and back again to the main routine. The use of subroutines allows for programming efficiency for implementing common routines; however, with programs becoming increasingly more complicated, and the number of common routines also growing, programs written in procedural languages are becoming increasingly complicated and difficult to maintain.

With modem computer programs becoming increasingly long and complex creations which may have many millions of lines of code, the concept of modularity is becoming increasingly important in the development of software. With a modular approach, the various functions of a computer program may be separated into modules which various programmers can work on independently. One popular programming paradigm that embodies the concept of modularity is that of object-oriented programming (OOP).

The central idea behind object-oriented programming is the object model, where all programs are structured as collections of interrelated objects, each of which represents an instance of some class in a hierarchy of object classes.

Object-oriented programming involves defining, creating, using, and reusing "objects," which can be used to model ideas and things in terms of their features (data) and behaviors (methods). Each object is a self-contained software element including data and methods for operating on the data. Objects are created by defining object classes from which objects are created, or "instantiated." The object classes are templates for creating objects. Each object created from a particular object class includes all the data and methods of the object class, as well as data and methods from its superclasses, and different objects of the same object class may be used for different purposes. Common object-oriented programming languages include Smalltalk, C++, and Java.

Other, non-OOP approaches are also commonly used, such as embodied in procedural programming languages and functional programming languages.

When design features may be cleanly divided among distinct elements, these approaches capture the benefits of modularity very well. However, these approaches fail to provide the proper support in certain situations, such as those involving shared resources, error handling, or other systemic issues where the same or similar functionality affects or is affected by many different elements.

The reason why these approaches are insufficient is that those issues cross-cut the primary modularization of the systems. Cross-cutting occurs when some particular concern depends on and/or must affect parts of the implementation of several of the functional modules of the system. Functional modules may include such software entities as objects and program modules, among others, and cross-cutting may occur across different software entities, in different places within the same software entities, or a combination of the two. Many cross-cuts are not weaknesses of the designs; they are a natural and unavoidable phenomena in complex systems, and they are the basis for the concept of "aspect."

Implementing those cross-cutting concerns in traditional programming languages, even object-oriented ones, typically requires scattering bits of code throughout the program, resulting in code that is referred to as "tangled."

An aspect is a concern that cross-cuts the primary modularization of a software system. An aspect-oriented programming language extends traditional programming languages with constructs for programming aspects. Such constructs can localize the implementation of cross-cutting concerns in a small number of special purpose program modules, rather than spreading the implementation of such concerns throughout the primary program modules. As with other types of software elements, an aspect may include both data and methods.

In order to capture the cross-cutting nature of aspects, such special program modules break the traditional rules of encapsulation in principled ways. They can affect the implementation of software entities implementing primary functionality without the explicit consent of those software entities; further, they can do that for several software entities simultaneously.

Aspect oriented programming (AOP) extends the expressive facilities available to the programmer, so that many design decisions can be expressed locally. The AOP programmer writes the base program in a traditional programming language, and also writes pieces of aspect code, each of which affects executions that are described in some parts of the base program.

In such a manner, aspect code can localize the implementation of some design patterns in a few modules, rather than spreading the fields and methods of those patterns throughout the classes, and can capture the tracing, debugging and instrumentation support for a complex system in a few modules, capture error handling protocols involving several classes in a single module, and capture resource sharing algorithms involving several classes in a single module, rather than as multiple code fragments tangled throughout the classes.

The special program modules for programming aspects enable this by cross-cutting the modularity of classes in principled ways. So one of those special program modules can affect the implementation of several classes (or several methods within a single class) in a clean, principled way. Aspect-Object interaction differs from Object-Object interaction and other traditional programming paradigms in that with the traditional approaches, all behaviors of the objects are encapsulated in the objects themselves, either as a direct implementation in the object class definition, as a request encoded in the object class definition to use the behaviors of other objects (e.g., a method call), or as a request in the object class definition to reuse the implementations of other object classes (e.g., through inheritance). Thus, in these traditional approaches, all control of an object's behavior lies with the object itself. In the AOP environment, on the other hand, a part of the object's behavior can be defined in an aspect outside of the object without the object having to request the behavior in any way. Thus, it can be said that a part of the object's behavior is transparently forced on the object by the aspect. Moreover, aspects have a more global effect in that one aspect can forces its behavior on multiple objects, possibly of different classes.

The paradigm of Aspect-Oriented Programming (AOP) was first introduced in Gregor Kiczales et al., *Aspect-Oriented Programming in Proceedings of the European Conference on Object-Oriented Programming (ECOOP 97)*, June 1997 ("Kiczales"), which is hereby incorporated by reference. A new unit of software modularity, called an aspect, is provided that appears to provide a better handle on managing cross-cutting concerns.

In Kiczales, only highly domain-specific aspect-oriented systems had been developed. It also addresses a goal of developing a general purpose AOP mechanism. However, it remains unknown in the art how to generalize from the very specific examples of AOP to arrive at the necessary abstractions to create a general model. Thus, aspect-oriented programming has remained a hypothetical paradigm having the goal of providing a clean separation between and among components and aspects.

SUMMARY OF THE INVENTION

The present invention is directed to system monitoring and tracing implemented in an aspect-oriented programming environment and avoids the shortcomings of prior art system monitors. A presently employed aspect-oriented programming environment is called AspectJ.

AspectJ is an extension to the object-oriented Java programming language. In AspectJ, object code is encapsulated in Java classes, and aspect code is encapsulated in special program modules called "aspects".

DETAILED DESCRIPTION OF THE INVENTION

In accordance with the present invention, the system of the present invention executes on a computer, such as a general purpose personal computer of a type well-known in the art. The present invention implements system monitoring functionality using aspect-oriented programming techniques. The system and monitor according to a present embodiment of the invention are implemented as computer software which may be installed directly on a local computer used for practicing the invention, such as by loading the software from non-volatile storage, or may be downloaded from one or more remote sites and installed on the local computer, or may even be installed from one or more remote computers. In an alternative embodiment of the present invention, an aspect library is provided including various generic monitoring and tracing functions which may be called as needed.

System Monitor

Figure 1:
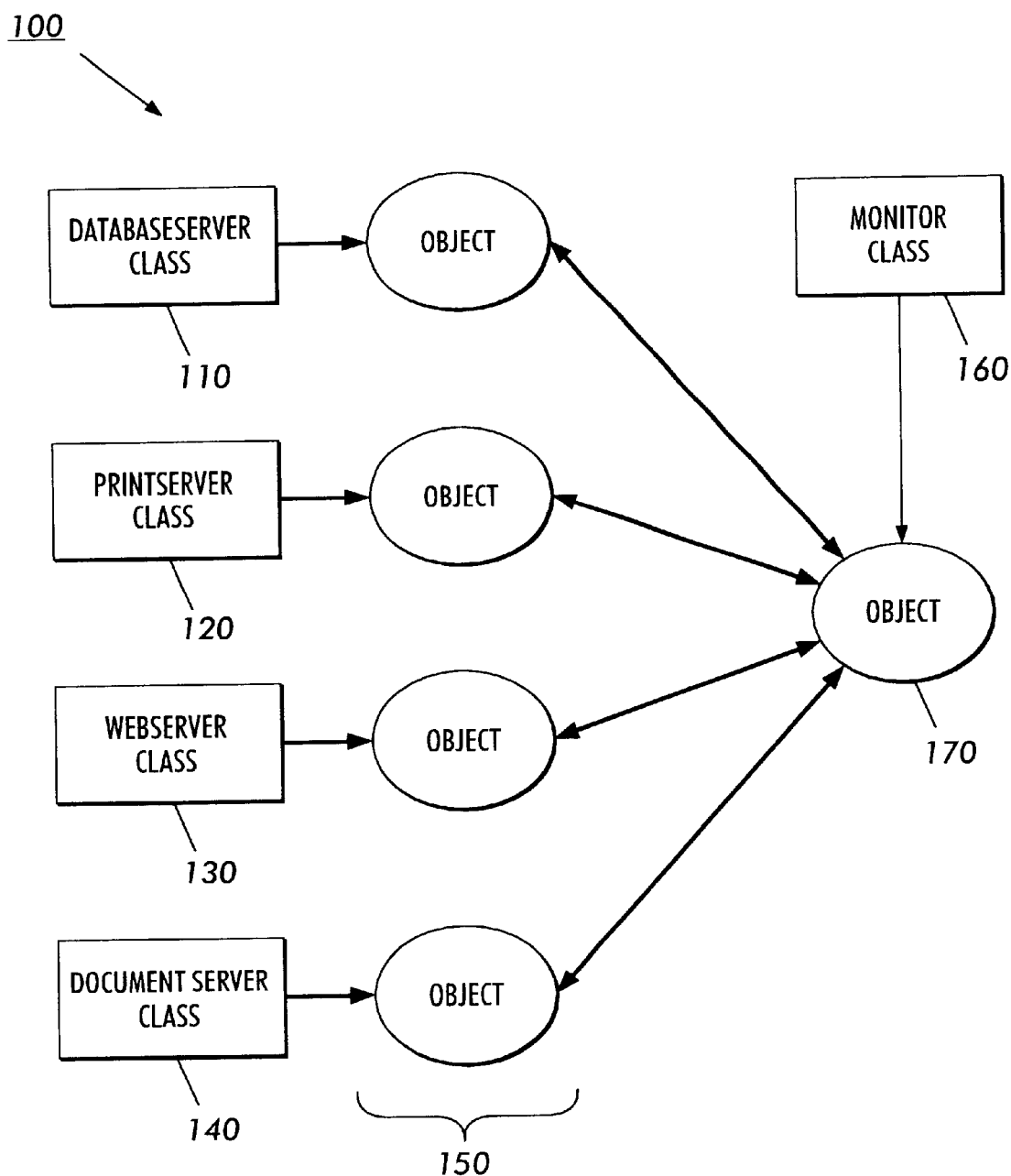
FIG. 1 is a block diagram of a monitoring system according to the prior art.

Referring to FIG. 1, prior art system monitoring such as implemented using object-oriented programming techniques includes a number of object class definitions for instantiating objects for accessing various resources. The exemplary system 100 being monitored includes various resources which are accessed via objects. Object class definitions provided in the system 100 for accessing the resources include a database server class 110 for providing access such as storing and retrieving data in a database (not shown), a printer server class 120 for providing access to output devices such as printers, plotters, and the like (not shown), a web server class 130 for providing hosting services for a World Wide Web (WWW) site (not shown), and a document server class 140 for providing storage and retrieval access to a document library (not shown).

When access to a resource is needed, an object 150 from the appropriate object class is instantiated. To monitor the activities of the resources, a system monitor object 170 is instantiated from a monitor object class 160.

Table 1, below, shows typical code for implementing an exemplary document server, DocumentServer, 140. As can be seen from the sample code, system monitoring and notification functions (shown in italics) are scattered throughout the code for implementing the document server functionality.

The method public int getId( ) {return id;} must also be added to the object class definition in order for the system monitor object 170 to request information from the resource concerning the condition detected. Otherwise, the resource object instance of the object class definition would be unable to handle any such requests.

TABLE 1

DocumentServer Resource Object Class

```
public class DocumentServer {
    private Monitor monitor;
    private int serverid;
    DocumentServer(Monitor m, int id) {
        monitor = m;
        serverid = id;
    }
    public Document convert(Document d, Format f) {
            monitor.anEvent(new ServiceEvent(this));
            try ( return convertData(d, f); }
            catch (Exception e) {
            monitor.anEvent(new ExceptionEvent(this, e));
            }
            finally {
                monitor.anEvent(new CompletionEvent(this));
            }
    }
    public void newDocument(Document d) {
            monitor.anEvent(new ServiceEvent(this));
            try { addDocument(d); }
            catch (Exception e) {
                monitor.anEvent(new ExceptionEvent(this, e));
            }
            finally {
                monitor.anEvent(new CompletionEvent(this));
            }
    }
    public int getId() { return id; }
}
```

Each resource object 150 must include behavior to interact (e.g., the italicized lines in Table 1) with the system monitor object 170, and the system monitor object must include behavior to interact (e.g., the parameter e.obj.getId( ) in Table 2) with the resource object 140.

Exemplary code for the corresponding object class implementing the system monitor appears in Table 2, below. The code displayed in italics, e.obj.getId( ), implements a request from the monitor object to the resource object for information concerning a condition or event.

TABLE 2

Monitor Object Class Definition

```
public class ServiceMonitor {
    private int totalServiceRequests, totalExceptions,
totalCompletions;
    void anEvent(ServiceEvent e) {
        printMessage("Service Request for server" + e.obj.getId());
        totalServiceRequests++;
    }
    void anEvent(ExceptionEvent e) {
        printMessage("Exception in server + e.obj.getId());
        total Exceptions++;
    }
    void anEvent(CompletionEvent e) {
        printMessage("Service Completion for server" + e.obj.getId());
        totalCompletions++;
    }
    void printMessage(String msg) {
        System.out.println("Monitor:" + msg);
    }
}
```

Each resource object class to be monitored must be coded in a manner such as described for the document server class 140. So, for a system with a large number of resources to be monitored, this coding becomes increasingly complex and difficult to keep track of.

Figure 2:
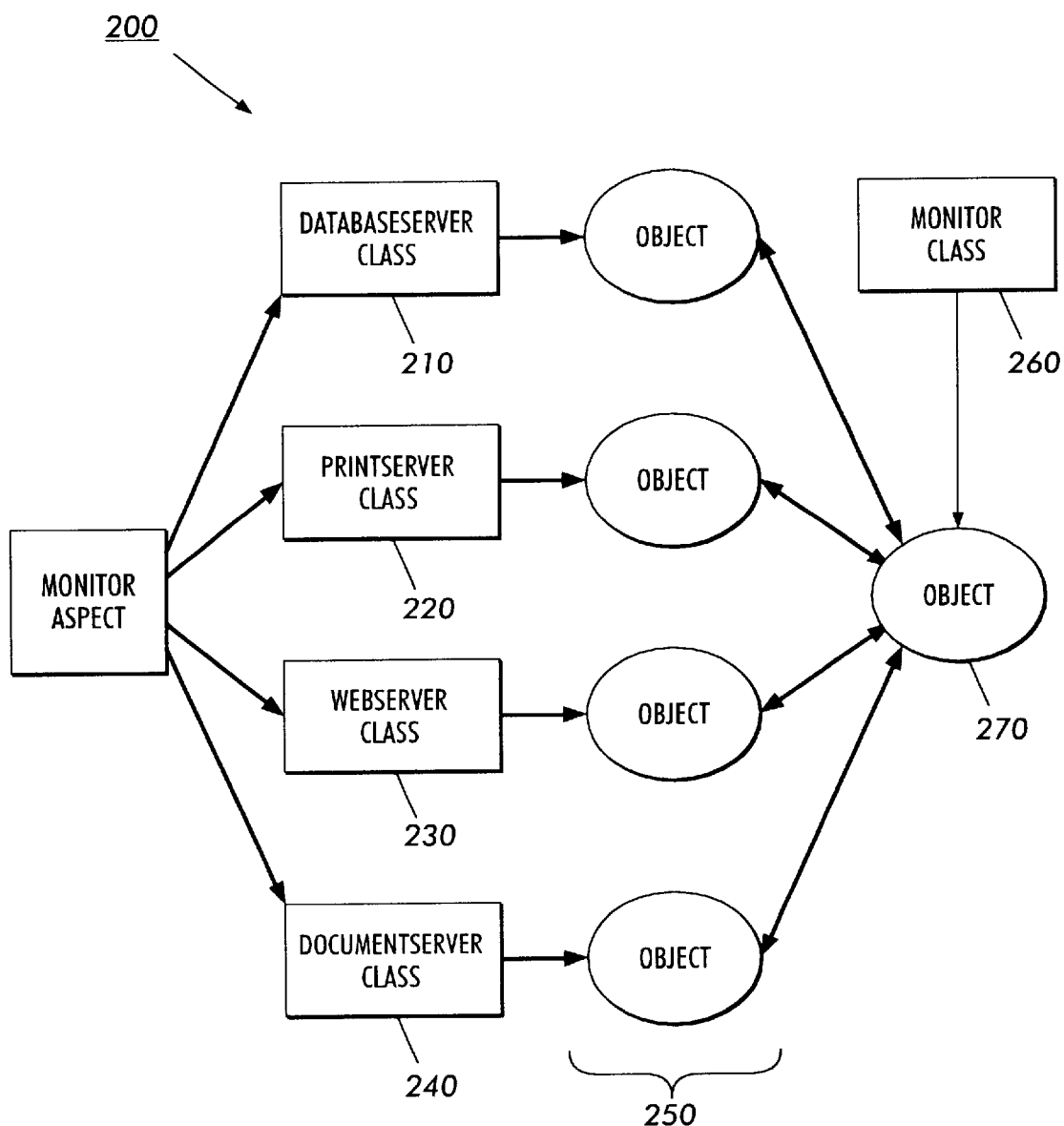
FIG. 2 is a block diagram of a first embodiment of a monitoring system according to the present invention.

FIG. 2 depicts a first way of implementing system monitoring according to the present invention. The system 200 to be monitored includes a number of resources such as in prior art system 100, as well as object 250 for providing access to the resources. A database server class 210 is provided for instantiating objects for storing and retrieving data in a database (not shown), a printer server class 220 is provided for instantiating objects for outputting information, a web server class 230 is provided for instantiating objects implementing hosting services for a World Wide Web (WWW) site (not shown), and a document server class 240 is provided for instantiating objects for storing and retrieving documents. Each of these servers may be practiced with a general purpose computing device such as a personal computer of a type known in the prior art. Each of these servers may also be practiced with special purpose workstations, dedicated to particular job functions, of types that are known in the art. Each of these server resources 210–240 will typically be accessed by one or more client computers (not shown) to service various types of requests.

In this first embodiment of system monitoring, a monitor object class 260 is provided for instantiating a monitor object 220. The monitor object implements behavior for receiving and reacting to notification of a condition or an event. A monitor aspect 280 is also provided which provides for the detection and notification of the condition or event. In this embodiment of the present invention, the programming for the actual monitoring function is separated from the portions of the system 200 implementing the resources, and is implemented by a monitor aspect 280.

The monitor aspect 280 modifies the functionality of the resource object classes 210–240 so that when a particular condition or event of interest occurs in an object's associated resource, the corresponding resource object instance 250 notifies the monitor object 270. Thus, neither the resource objects 250 nor the monitor object 270 are aware of the monitor aspect 280. The monitor aspect 280 does this by transparently forcing its behavior on the resource object definitions 210–240.

In this embodiment, the code for the DocumentServer Resource Object Class may be devoted to implementing the resource functionality, such as shown in Table 3. The only monitoring behavior that is necessary is the public int getId( ) {return id;} method, which permits a monitor object to request information from the resource object.

TABLE 3

DocumentServer Resource Object Class

```
public class DocumentServer {
    private int serverid;
    DocumentServer(int id) {
        serverid = id;
    }
    public Document convert(Document d, Format t) {
        return convertData(d, f);
    }
    public void newDocument(Document d) {
        addDocument(d);
    }
    public int getId() { return id; }
}
```

Tables 4 and 5, below, illustrate an exemplary monitor class definition 260 and a monitoring aspect definition 280 according to the present invention, respectively. Note that the code in Table 4 is the same as that in Table 2.

TABLE 4

Monitor Object Class Definition

```
public class ServiceMonitor {
    private int totalServiceRequests, total Exceptions,
totalCompletions;
    void anEvent(ServiceEvent e) {
        printMessage("Service Request for server" + e.obj.getId());
        totalServiceRequests++;
    }
    void anEvent(ExceptionEvent e) {
        printMessage("Exception in server" + e.obj.getId());
        total Exceptions++;
    }
    void anEvent(CompletionEvent e) {
        printMessage("Service Completion for server" + e.obj.getId());
        totalCompletions++;
    }
    void printMessage(String msg) {
        System.out.println("Monitor:" + msg);
    }
}
```

In this embodiment, the monitor object encapsulates the functionality for receiving and responding to a notification of the detection of a condition in the resource. Exemplary code for the monitoring aspect definition 280, shown in Table 5, below, encapsulates the monitoring functionality for detecting a condition and sending a notification of the detection to the monitor object 220. This monitoring functionality is the behavior that will be transparently forced on the resource object classes 210–240 when the system 200 is compiled.

TABLE 5

Monitor Aspect Definition

```
aspect ServiceMonitoringProtocol {
    static ServiceMonitor monitor = new ServiceMonitoring();
    introduce ServiceMonitor DatabaseServer.monitor = monitor;
    introduce ServiceMonitor WebServer.monitor = monitor;
    introduce ServiceMonitor PrinterServer.monitor = monitor;
    introduce ServiceMonitor DocumentServer.monitor = monitor;
    advise * DatabaseServer.query(..), * WebServer.post(..),
        * WebServer.get(..), * PrinterServer.print(..),
        * DocumentServer.convert(..),
        * DocumentServer.newDocument(..) {
        static before {
            monitor.anEvent(new ServiceEvent(thisObject));
        }
        static catch (RuntimeException e) {
            monitor.anEvent(new ExceptionEvent(thisObject, e));
            throw e;
        }
        static finally {
            monitor.an Event(new CompletionEvent(thisObject));
        }
    }
}
```

The behavior of the aspect is forced on the object class using a compiler that is aspect-oriented, i.e., one that can handle aspects. Such a compiler compiles the object class definitions and aspect definitions of a system such that the code from the aspects affects the behavior of the objects. Such a compiler is described in greater detail in copending patent application, U.S. Ser. No. 09/358,638, entitled AN ASPECT-ORIENTED PROGRAMMING INTEGRATED DEVELOPMENT ENVIRONMENT, filed concurrently with the present application and assigned to the present assignee, and is hereby incorporated into the present specification by reference.

Figure 3:
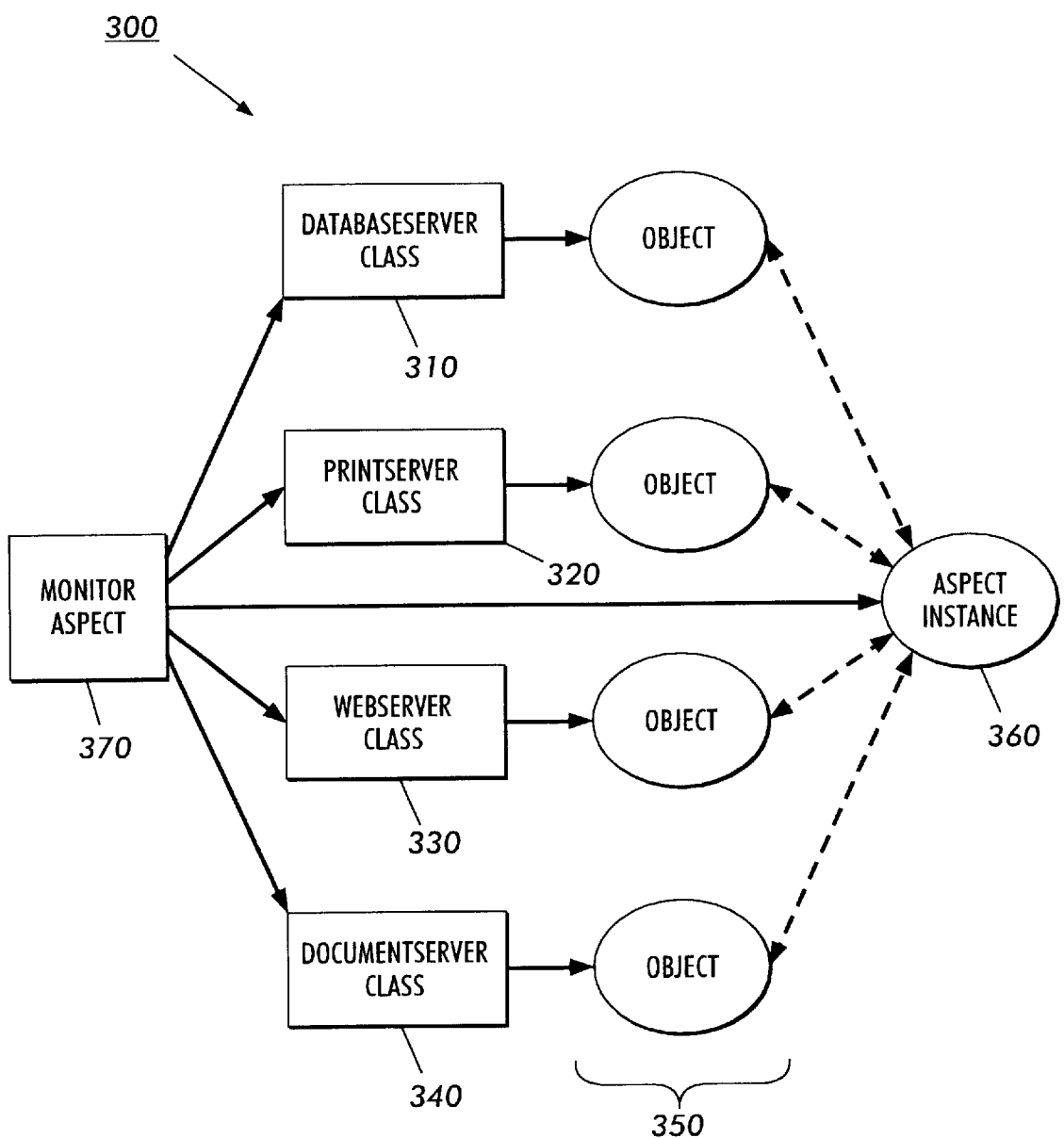
FIG. 3 is a block diagram of a second embodiment of a monitoring system according to the present invention.

FIG. 3 depicts a second way of implementing system monitoring according to the present invention. The exemplary system 300 includes a number of resources such as in prior art system 100, as well as object classes for providing access to the resources. A database server class 310 is provided for instantiating objects for storing and retrieving data in a database, a printer server class 320 is provided for instantiating objects for outputting information, a web server class 330 is provided for instantiating objects implementing hosting services for a World Wide Web (WWW) site, and a document server class 340 is provided for instantiating objects for storing and retrieving documents. The server object class definitions 310–340 and resource objects instantiated therefrom 350, have similar or the same properties as analogous entities in the prior art system and the system of the previously discussed embodiment.

Unlike the previous embodiment, there is no need for a monitor object 270 or monitor object class definition 260. Instead, the monitor aspect 370 encapsulates all the monitoring behavior. A monitor aspect 370 acts to force monitoring behavior on the resource object classes 310–340, as well as to create a monitor aspect instance 360, which transparently forces the resource objects 350 to provide notification of events to the monitor aspect instance 360. Additionally, the monitor aspect 370 includes functionality for handling the notifications of the events by allowing the monitor aspect 360 to break the encapsulation of the resource objects to get or change the state of the resource objects.

Referring to Table 6, below, an exemplary monitor aspect definition 360, according to this embodiment of the present invention is shown.

TABLE 6

Service Monitor Aspect Definition

```
aspect ServiceMonitoring {
    int totalServiceRequests, totalExceptions, totalCompletions;
    advise * DatabaseServer.query(..), * WebServer.post(..),
        * WebServer.get(..), * PrinterServer.print(..),
        * DocumentServer.convert(..),
        * DocumentServer.newDocument(..) {
        before {
            printMessage("Service Request for server" + thisObject.id); //
note the direct access!
            totalServiceRequests++;
        }
        catch (RuntimeException e) {
            printMessage("Exception in server" + thisObject.id);
            total Exceptions++;
            throw e;
        }
        finally {
            printMessage("Service Completion for server" +
thisObject.id);
            totalCompletions++;
        }
    }
    static ServiceMonitoring monitor = new ServiceMonitoring();
    advise DatabaseServer(..), WebServer(..),
            PrinterServer(..), DocumentServer(..) {
        static after {
            monitor.addObject(thisObject);
            // can be removed dynamically
        }
    }
    void printMessage(String msg) {
        System.out.println("Monitor:" + msg);
    }
}
```

The italicized code in Table 6 shows some of the mechanisms in AspectJ that support the direct intervention of aspect instances in the objects.

With either way of implementing system monitoring according to the present invention, all the programming for the system monitoring functionality is done separate from the programming for the resources. Thus, system monitoring may be implemented simply by compiling the objects along with the monitoring aspects. When monitoring is no longer needed, the objects are simply recompiled without the aspects.

Related to system monitoring is the concept of tracing, which generally involves monitoring the execution of a program, and is commonly practices by monitoring accesses to particular objects forming the program.

Figure 4:
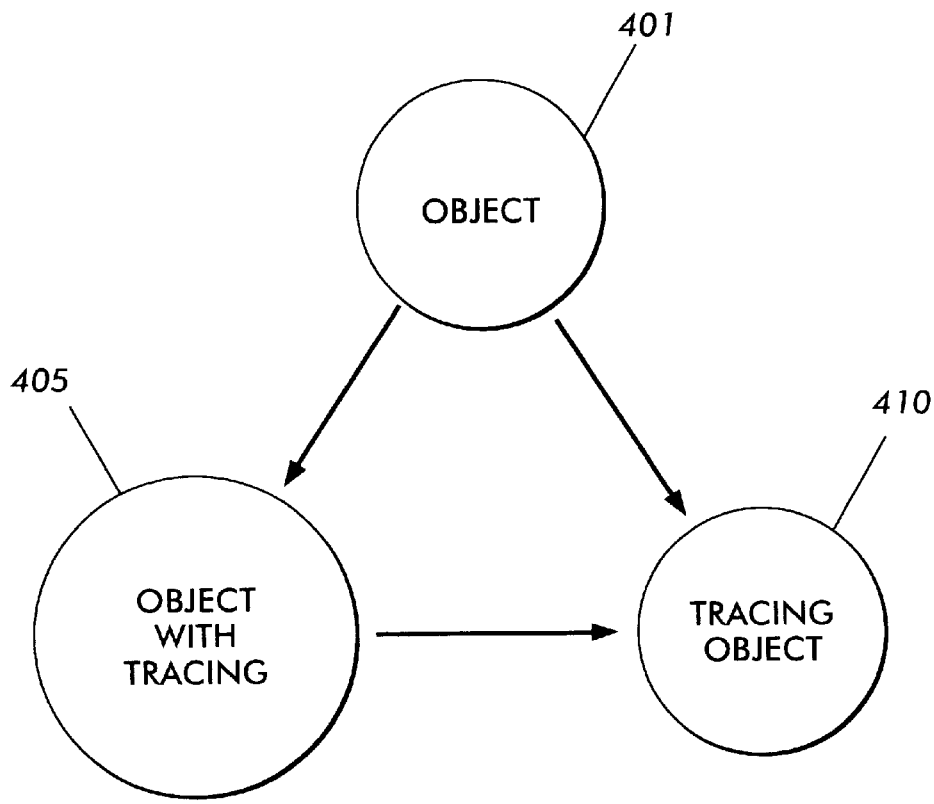
FIG. 4 illustrates an implementation of tracing according to the prior art.
Figure 5:
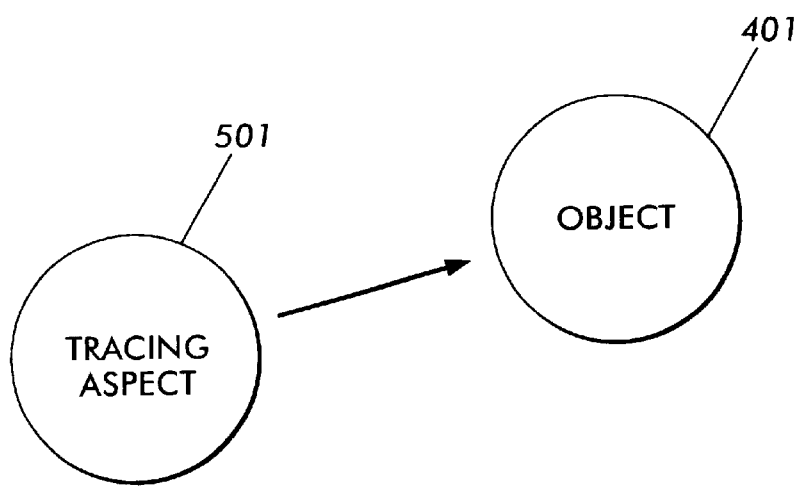
FIG. 5 illustrates an implementation of tracing according to the present invention.

Referring to FIGS. 4 and 5, FIG. 4 illustrates a prior art way to implement tracing. In traditional functional and object-oriented languages, tracing is a somewhat ad-hoc addition to the system that involves a fair amount of human intervention. If a programmer wants to trace the calls to Point objects, the Point object class 401 definition must be edited to include calls 405 to a Tracing object class 410 throughout the Point object class 401 definition.

Exemplary code for an object class, Point 401, is shown in Table 7, below.

TABLE 7

Point Class Definition without Tracing

```
class Point {
    private int _x;
    private int _y;
    void setX(int x) {
        _x = x;
    }
    void setY(int y) {
        _y = y;
    }
    void set (int x, int y) {
        _x = x; _y = y;
    }
    int getX( ) {
        return _x;
    }
    int getY( ) {
        return _y;
    }
}
```

After tracing is implemented for the class, the code appears as in Table 8, below. As can be seen be the italicized lines in the modified object class Point 405, many lines of code are required to implement the tracing, and the code is scattered throughout the class definition.

TABLE 8

Point Class Definition with Tracing

```
class Point {
    private int _x;
    private int _y;
    void setX(int x) {
        Tracing.in("Point.setX " + "x = " + x);
        _x = x;
        Tracing.out("Point.setX");
    }
    void setY(int y) {
        Tracing.in("Point.setY " + "y = " + y);
        _y = y;
        Tracing.out("Point.setY");
    }
    void set (int x, int y) {
        Tracing.in("Point.set" + "x = " + x + "y = " + y);
        _x = x; _y = y;
        Tracing.out("Point.set");
```

TABLE 8-continued

Point Class Definition with Tracing

```
    }
    int getX( ) {
        Tracing.in("Point.getX");
        try { return _x; }
        finally { Tracing.out("Point.getX"); }
    }
    int getY( ) {
        Tracing.in("Point.getY");
        try { return _y;
        finally { Tracing.out("Point.getY"); }
    }
}
```

A Tracing object 410 is used to report the results of tracing, as shown in exemplary code in Table 9, below.

TABLE 9

Tracing Object Class Definition

```
class Tracing {
    static boolean enabled = true;
    public static void in(String name) {
        if (enabled)
            System.out.println("Entering " + name);
    }
    public static void out(String name) {
        if (enabled)
            System.out.println("Exiting " + name);
    }
}
```

As with the problem associated with implementing and removing system monitoring, a problem with this approach is that whenever tracing is to be added, the object class definition must be edited to add the calls to a tracing object. When tracing is not longer desired, the object class definition must be edited again to remove the calls.

Referring to FIG. 5, the present invention implements tracing in a localized tracing aspect 501, and the object class definition 410 is not edited. The aspect includes all the code necessary to perform tracing. When tracing is to enabled, the programmer merely has to compile to object class 410 with the Tracing aspect 501. Disabling tracing is accomplished simply by recompiling without the tracing aspect. To implement tracing with the present invention, a tracing aspect 501 is compiled along with the unmodified object class, Point 401. Exemplary code for the Tracing aspect is shown in Table 10.

TABLE 10

Tracing Aspect Definition

```
aspect Tracing {
    advise * Point.*(..) {
        static before {
            System.out.println("Entering" + thisClassName + "." +
thisMethodName + " " +
Tracing.buildString(thisJoinPoint.methodParameterNames,
thisJoinPoint.methodParameters));
        }
        static after {
            System.out.println("Exiting" + thisClassName + "." +
thisMethodName);
        }
    }
    static StringBuffer buildString(String[ ] pnames, Object[ ] pvalues)
    {
```

TABLE 10-continued

Tracing Aspect Definition

```
      StringBuffer str = new StringBuffer();
      for (int i = 0; i < pnames.length; i++) {
        str.append(pnames[i]); str.append(" = ");
        str.append(pvalues[i]); str.append(" ");
      }
      return str;
    }
}
```

When tracing is no longer needed or desired, it is easily removed by simply recompiling the Point object class 401 without the Tracing aspect 501.

System Monitoring/Tracing Aspect Library

Figure 6:
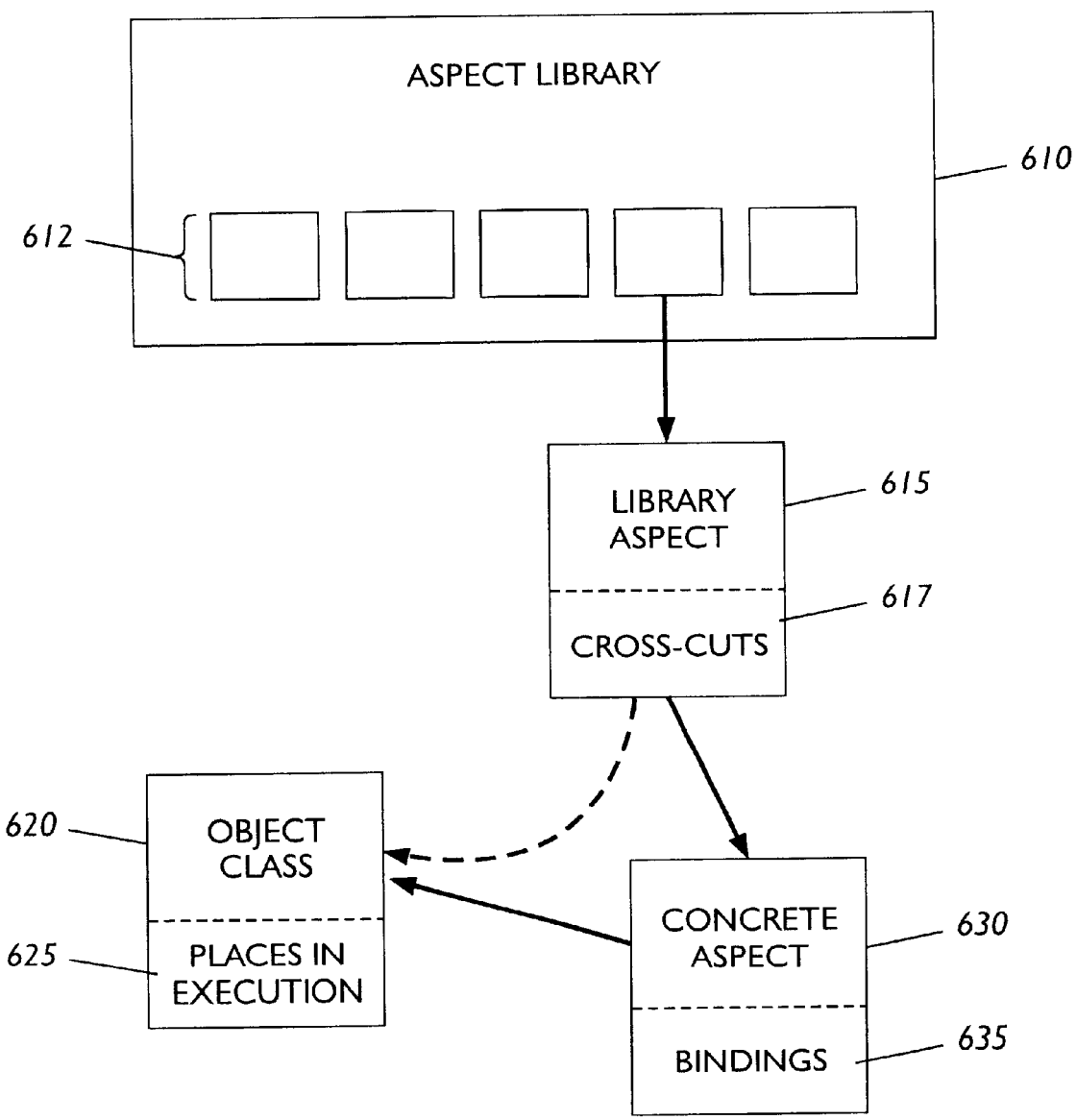
FIG. 6 is a block diagram of an aspect library according to the present invention.

Referring to FIG. 6, in an alternative embodiment of the present invention, an aspect library 610 is provided including various generic monitoring and tracing functions as library aspects 612, including exemplary library aspect 615. When use of library aspects is desired, the library aspects are bound to object classes 620 by concrete aspects 630.

When the system monitoring and tracing aspects are to be implemented as part of a generic library, it is beneficial to make them abstract, without reference to specific objects. To accomplish this, library aspects 615 are implemented with cross-cuts 617 which act as placeholders to allow a concrete aspect 630, defined by a developer, to define bindings 635 between the names of the cross-cuts 617 in the library aspect 615 to concrete points in the execution 625 of the object class 620.

Aspect libraries and the implementation of library aspects are described in more detail in patent application, U.S. Ser. No. 09/357,738, entitled ASPECT-ORIENTED PROGRAMMING, filed concurrently with the present invention and assigned to the present assignee, and is hereby incorporated into the present specification by reference.

While the present invention has been described in relation to an object-oriented environment, those skilled in the art will appreciate that these techniques may readily be applied to other programming paradigms without departing from the spirit and scope of the present invention.

What is claimed is:

1. In a computer system having a processor, memory, an aspect-oriented operating environment that supports aspects which implement concerns that cross-cut an overall functionality of a software entity defining one or more of the plurality of resources to be monitored, the software entity comprising either one or more program bodies or one or more object classes, the aspects operating by transparently forcing their behavior on the software entity, and a plurality of resources, a monitor for a resource, the resource including a software entity that defines the overall functionality of a resource to be monitored, the monitor comprising:

an aspect that defines cross-cutting functionality that affects the functionality of the resource to be monitored by implementing monitoring behavior, the aspect further defining a condition associated with the resource to be monitored, wherein the aspect transparently forces its behavior on the software entity, the aspect comprising:

1) functionality that detects satisfaction of the condition associated with the resource; and
2) functionality that provides a notification that the condition associated with the resource has been satisfied.

2. The monitor of claim 1, wherein the aspect is included as part of an aspect library.

3. The monitor of claim 1, wherein the monitoring behavior implemented by the aspect comprises functionality that detects the condition, and functionality that sends a notification upon detecting the condition, the monitor further comprises a monitor software entity that defines functionality for responding to the notification.

4. A method for implementing monitoring for a resource operating in an aspect-oriented operating environment, the resource including a software entity that defines an overall functionality of a resource to be monitored, the aspect-oriented operating environment supporting aspects which implement concerns that cross-cut an overall functionality of a software entity defining one or more of the plurality of resources to be monitored, the software entity, the aspects operating by transparently forcing its behavior on the software entity, the method comprising:

a) creating a monitor aspect that defines cross-cutting functionality that affects the functionality of the resource to be monitored by implementing monitoring behavior, the monitor aspect further defining a condition associated with the resource to be monitored, wherein the monitor aspect transparently forces its behavior on the software entity, the monitor aspect comprising:

1) functionality that detects satisfaction of the condition associated with the resource; and
2) functionality that provides a notification that the condition associated with the resource has been satisfied; and b) compiling the software entity along with the monitor aspect to thereby create computer-executable code which implements the resource functionality as well as the monitoring behavior.

5. A computer-readable medium for use in a computer system having a processor, memory, an aspect-oriented operating environment that supports aspects which implement concerns that cross-cut an overall functionality of a software entity defining one or more of the plurality of resources to be monitored, the software entity comprising either one or more program bodies or one or more object classes, the aspects operating by transparently forcing their behavior on the software entity, and a plurality of resources, a monitor for a resource, the resource including a software entity that defines the overall functionality of a resource to be monitored, the computer-readable medium having computer-executable instructions implementing a the monitor comprising:

an aspect that defines cross-cutting functionality that affects the functionality of the resource to be monitored by implementing monitoring behavior, the aspect further defining a condition associated with the resource to be monitored, wherein the aspect transparently forces its behavior on the software entity, the aspect comprising:

1) functionality that detects satisfaction of the condition associated with the resource; and
2) functionality that provides a notification that the condition associated with the resource has been satisfied.

* * * * *